Nov. 22, 1955 S. T. BREWER 2,724,745
SIGNAL AMPLITUDE DETECTOR AND INDICATOR
Filed May 6, 1954
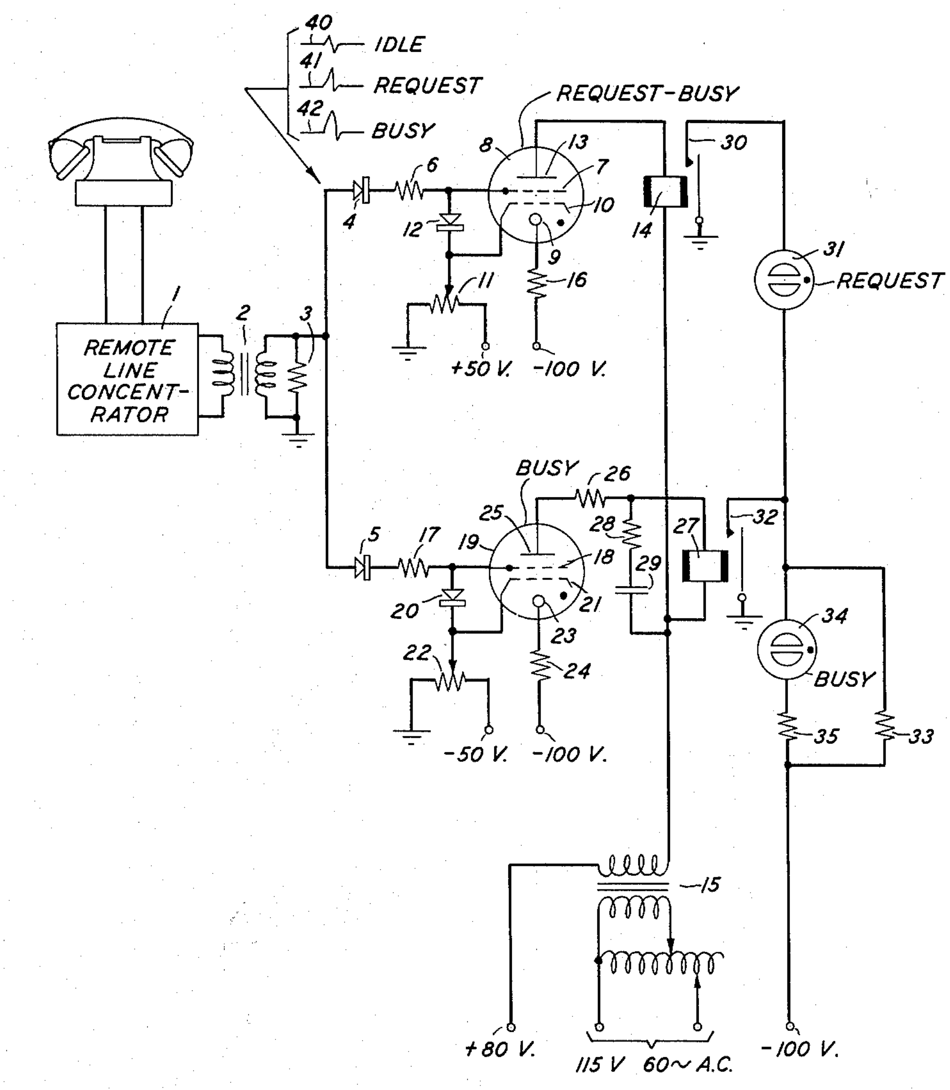
INVENTOR
S. T. BREWER
BY [signature]
ATTORNEY

United States Patent Office 2,724,745

Patented Nov. 22, 1955

2,724,745

SIGNAL AMPLITUDE DETECTOR AND INDICATOR

Sherman T. Brewer, Chatham Township, Morris County, N. J., assignor to Bell Telephone Laboratories, Incorporated, New York, N. Y., a corporation of New York Application May 6, 1954, Serial No. 427,922

5 Claims. (Cl. 179—18)

This invention relates to electrical pulse analyzing circuits and more particularly to electrical circuits for detecting electrical pulses of different amplitudes and for providing indications thereof.

The selection and actuation of one of a number of indicating or signaling elements in accordance with the amplitude characteristic of received electrical signals is an operation required in many electrical systems. A wide variety of circuits have been designed for this purpose and are in common use in communication systems, telemetering systems, radiation detection systems and the like.

One such use is in a telephone system where it is often desirable to ascertain the service condition of a subscriber line, such as the idle, busy or service requesting condition thereof, at a point remote from the line. For example, this may be the central office in a telephone system having a remote line concentrator positioned between the central office and the subscriber lines. In the exemplary system disclosed below and in application Serial No. 427,921, filed May 6, 1954, of S. T. Brewer, W. A. Reenstra, and W. J. Ritchie, a voltage pulse of distinct amplitude for each of the three possible line conditions is transmitted from the line circuit of the line being tested to a detecting and indicating circuit in the central office.

It is an object of this invention to provide an improved device for indicating the condition of an electrical equipment.

Another object of this invention is to enable the condition of a plurality of lines to be analyzed and displayed at a point remote from the lines.

A further object of this invention is to provide a simplified detector for distinguishing pulses related in amplitude to the service conditions of a subscriber line in a telephone system and for displaying visual indications of these conditions.

It is still a further object of this invention to provide a simplified display apparatus for indicating when one or both of a pair of discharge devices are operated.

In the specific illustrative embodiment of the detecting and indicating circuit described herein, two gas discharge tubes are provided each having their control electrodes so connected to the transmitting circuit that an indication impulse of a first magnitude causes neither of the tubes to be fired, an indication impulse of a second magnitude causes one tube to be fired, and an indication impulse of a third magnitude causes both of the tubes to be fired. Each of the gas tubes has a relay connected in series with its anode which is operated when its associated tube is fired. The contacts of these relays are connected with two indicators in such a manner that the operation of one relay when an impulse of the second magnitude is received causes only one indicator to operate while the operation of both relays when an impulse of the third magnitude is received causes only the other indicator to operate. The tubes are normally in their deenergized state and when once made conductive are again deenergized through a negative potential applied to the anode circuits of the tubes.

The indicating devices may be any form of desired signaling or registering apparatus which is preferably energized through the closing of the normally open contacts of the relays.

In accordance with one feature of this invention, a pair of indicating devices are controlled by a pair of discharge tubes so that the conduction of one discharge tube will cause one indicating device to operate and the conduction of both of the space discharge tubes will cause the other indicating device to operate.

More specifically, in accordance with one feature of this invention, each discharge tube controls a relay in its anode circuit, the operation of which completes the circuit of an indicating device so that a first indicating device is operated by the conduction of one space discharge tube and a second indicating device is operated by the conduction of two space discharge tubes.

In accordance with another feature of this invention, the means for applying anode voltage to the discharge tubes include a constant voltage source and an alternating voltage source, the sum of the voltages of the sources being sufficient to maintain conduction in the tubes when the alternating current voltage is positive and to extinguish conduction when the alternating current is negative to prepare the tubes for a subsequent operation.

These and other features, objects and advantages of the invention will be apparent from the accompanying description and the drawing, which shows a preferred illustrative embodiment of a signal detecting and indicating circuit in accordance with the present invention. The remote electrical equipment to which the indicating device is connected is not shown in detail as the form of such equipment is immaterial insofar as the operation of the detecting and indicating device is concerned.

In the illustrative embodiment of the invention the remote equipment 1 is preferably a line circuit in a remote line concentrator which transmits impulses indicative of the service condition of the line being tested. Such a line circuit is shown in the copending applications Serial No. 427,921 of S. T. Brewer, W. A. Reenstra and W. J. Ritchie, referred to above, and Serial No. 427,965, filed May 6, 1954, of W. A. Reenstra, and transmits over a lead or trunk a small pulse 40 to indicate an idle line, a pulse of intermediate magnitude 41 to indicate a line requesting service and a large pulse 52 to indicate a busy line.

These input pulses to the detector are developed across the input transformer 2 and the resistor 3 connected across the secondary winding thereof. Connected to the secondary winding are diodes 4 and 5 which are poled so as to pass impulses of positive plurality from the winding to the control electrodes of the tubes 8 and 19. Diode 4 is connected through a resistor 6 to the control electrode 7 of a gaseous discharge device 8, which advantageously may be a cold cathode gas tube of the type disclosed in the Hans L. von Gugelberg Patent 2,607,021, August 12, 1952. This gas tube has the desirable characteristic of very short ionization time, which is obtained by maintaining a continuous keep-alive discharge between a small cathode 9 and a large flat cathanode 10, the latter being apertured to permit the transfer of electrons therethrough. The cathanode 10 is held biased with respect to the control grid 7 by means of a potentiometer 11 that is connected between a positive 50 volt potential source and ground. The cathanode 10 is connected to the movable contact of the potentiometer, which contact is connected to the control grid 7 through a diode 12. The anode 13 of tube 8 is connected to one end of a relay coil 14, the other end of which is connected through the secondary winding of transformer 15 to a source of a positive potential which may be 80 volts. The primary winding of transformer 15 is connected to a 60 cycle 115 volt alternating current source. The cathode 9 of the gas tube 8 is connected to negative 100 volt source by a resistor 16.

The diode 5 is similarly connected through a resistor 17 to the control grid 18 of a cold cathode gaseous discharge tube 19, which may also be of the type disclosed in Patent 2,607,021. Grid 18 is connected through a diode 20 to a cathanode 21 and to a potentiometer 22 which is connected between ground and a positive 50 volt source of bias potential. The cathode 23 of the gaseous tube 19 is connected through a resistor 24 to a negative 100 volt source. The anode 25 of tube 19 is connected through a resistor 26 to the relay coil 27 which has a resistor 28 in series with a condenser 29 connected thereacross and which is returned to the same potential source as relay coil 14.

Contacts 30 of relay coil 14 are connected on one side to ground and on the other to one electrode of the gaseous diode 31, which advantageously may be a neon lamp. The other electrode of the diode 31 is connected to one end of a resistor 33, the other end of which is connected to a negative 100 volt source. The last-named electrode of the diode 31 is also connected to one side of the contacts 32 and to one electrode of a gaseous diode 34 which is similar to diode 31. The other electrode of diode 34 is connected through a resistor 35 to the negative 100 volt source, and the other side of the contacts 32 is connected to ground.

There is normally a discarge present in tube 8 between the keep-alive cathode 9 and the cathanode 10. In the absence of any signal on the control grid 7, this grid is biased negatively with respect to the cathanode 10 and there is no conduction in the main gap of the tube, i. e., from the cathanode 10 to the main anode 13. If the control grid 17 is made sufficiently positive to overcome the cut-off bias, the charge particles are injected from the keep-alive discharge into the main gap, causing rapid breakdown of the main gap, and the relay 14 in series with this gap will be operated. It should be noted that the voltage for the main anode 13 of tube 8 is furnished by the positive 80 volt source in series with the 65 volt root mean square alternating current voltage from the transformer 15. During the portion of the operating cycle when pulse signals are present on the grid 7, the sum of these two voltages is sufficiently high to permit conduction to take place in the main gap of tube 8. During the interval between signal pulses, the 65 volt alternating current signal reverses polarity, and causes the anode voltage to drop sufficiently to extinguish any triggered tube and to restore the detector to the ready state for next input signal.

The operation of tube 19 is substantially the same as that described above for tube 8.

The size of a positive pulse required to trigger either of the gas tubes 8 or 19 into conduction may be regulated by varying the main cathode bias. This is controlled by individual adjustment of the potentiometers 11 and 22, respectively, which determines the positive potential on the main cathodes of these tubes. In the case of tube 8, the bias is adjusted so that the tube is not triggered with an idle pulse, but will be triggered by a request or busy pulse. In the case of tube 19 the bias is adjusted so that the tube will not be triggered by either an idle or a request pulse, but will be triggered by a busy pulse.

Thus, an idle pulse 40 at the input transformer 2 will not trigger either tube 8 or tube 19. A request pulse 41, which is of greater positive magnitude than an idle pulse, will trigger tube 8 but will not be sufficient to overcome the bias of tube 19. The busy pulse 42 has sufficient amplitude to trigger both tube 8 and tube 19. As each detector tube is triggered its associated relay operates. The contacts on these relays are arranged to light the request and busy indicators 31 and 34, respectively. Obviously, neither indicator will light on an idle pulse. When a request pulse is present, tube 8 is triggered and operates the relay 14. The contacts 30 of the latter relay close and complete a circuit through the negative 100 volt source and resistor 33 to light indicator tube 31. The drop across resistor 33 is sufficiently small so that the potential across tube 34 prevents the latter from breaking down. If a busy pulse occurs, both tubes 8 and 19 are triggered. In this case, the relays 14 and 27 are operated and close their associated contacts 30 and 32, respectively, to light indicator lamp 34. The request indicator lamp 31 cannot operate as both electrodes of the lamp are connected to ground by the contacts 30 and 32. The combination of resistor 28 and condenser 29 which are connected across the relay coil 27 is provided to cause a delay in the release of relay coil 27. This staggers the release times of the two relays 14 and 27 to prevent a momentary false request indication.

The diode resistor input networks for the detector tubes 8 and 19 are used to prevent these tubes from interacting with each other and producing undesirable results. For example, whenever a detector tube is triggered, a large positive pulse appears on its control grid since the grid acts as a probe in the main gap discharge within the tube. If the input networks were not present this positive voltage would be fed back into the grid of the other detector tube via the common input circuit and could cause the latter tube to trigger falsely. The diodes in the input circuit are poled so that the path between the tubes presents a large impedance to these positive pulses and thus sympathetic triggering of the detector tubes is avoided.

It is to be understood that the term "diode" as employed for the elements 4 and 5 in the above description of the specific illustrative embodiment of the invention may advantageously comprise any suitable rectifier, vacuum tube, gaseous discharge device, or any other unidirectional current device.

It is to be further understood that the above-described arrangements are but illustrative of the application of the principles of this invention. Numerous other arrangements may be devised by those skilled in the art without departing from the spirit and scope of the invention.

What is claimed is:

1. An electrical circuit for indicating the condition of subscriber lines in a telephone system comprising a source of signals, the amplitudes of which are related to the idle, busy, or requesting service condition of a subscriber line, a first and second gaseous discharge device, each having an anode, a cathode and a control grid, a first diode having one terminal connected to said source and the other to the grid of said first device, a second diode having one terminal connected to said source and the other to the grid of said second device, means to apply bias potentials to each of said devices to render them normally nonconducting, a source of anode voltage for said devices, a first electromagnetic relay means having a pair of contacts connected between the voltage source and the anode of said first discharge device, a second electromagnetic relay means having a pair of contacts connected between the voltage source and the anode of said second discharge device, and means to indicate the condition of the lines associated with the signals received by the detector from said signal source, said means comprising a glow tube in circuit with the contacts of said first and second electromagnetic relays and a glow tube in circuit with the contacts of said second electromagnetic relay wherein the conduction of one of said gaseous discharge devices will cause one of said glow tubes to operate and conduction of both of said gaseous discharge devices will cause the other of said glow tubes to operate.

2. An electrical circuit for detecting the condition of a subscriber line in a telephone system comprising a pair of gaseous discharge devices, means for applying pulses to said devices dependent on the condition of a subscriber line, said pulses being of at least two different amplitudes, means biasing the first of said devices to conduct on reception of a pulse of either amplitude, means biasing the second of said devices to conduct only on reception of a pulse of a larger of said amplitudes, a first and a second relay connected to said first and second devices, respectively, and activated on conduction in said devices to close normally open contacts thereof, a pair of indicating devices each having a pair of electrodes, said indicating devices being connected in series, the normally open contacts of said first relay being connected between ground and one electrode of one of said indicating devices and the normally open contacts of said second relay being connected between ground and the junction of the second electrode of said one device and one electrode of said other device, a voltage source connected to said second electrode of said other indicating device, and an impedance across said electrodes of said other indicating device whereby on activation of said first relay only said one indicating device is operated and on activation of both of said relays only said other indicating device is operated.

3. An electrical circuit in accordance with claim 2 further comprising means for delaying release of said second relay on cessation of conduction in said discharge device so that said first relay releases before said second relay to prevent false operation of said first indicating device.

4. An electrical circuit in accordance with claim 3 wherein said gaseous discharge devices each include means for maintaining a keep-alive discharge therein, means including an anode defining a main gap and a control grid allowing injection of charge carriers from said keep-alive discharge into said main gap of said discharge device on reception of appropriate pulses to said devices.

5. An electrical circuit in accordance with claim 4 further comprising means for applying a voltage to said anodes of each of said discharge devices, said means including a constant voltage source and an alternating current voltage source, the summation of the voltages of said sources being sufficient to maintain conduction in said devices when said alternating current voltage is positive and to extinguish conduction when said alternating current voltage is negative to prepare said discharge devices for the detection of the next pulse dependent on the condition of a subscriber line.

References Cited in the file of this patent

UNITED STATES PATENTS 2,424,243 Lowell ---------------- Jan. 9, 1944